US012755154B2

(12) United States Patent
Jarod Ely

(10) Patent No.: US 12,755,154 B2
(45) Date of Patent: Oct. 6, 2026

(54) METHOD FOR STABILIZING NEURAL PATHWAYS IN EARLY-PHASE ARTIFICIAL NEURAL NETWORK TRAINING

(71) Applicant: Joshua Jarod Ely, Pennington Gap, VA (US)

(72) Inventor: Joshua Jarod Ely, Pennington Gap, VA (US)

( * ) Notice: Subject to any disclaimer, the term of this patent is extended or adjusted under 35 U.S.C. 154(b) by 0 days.

(21) Appl. No.: 19/001,566

(22) Filed: Dec. 26, 2024

(65) Prior Publication Data

US 2026/0187442 A1 Jul. 2, 2026

(51) Int. Cl.
*G06N 3/08* (2023.01)

(52) U.S. Cl.
CPC .................................... *G06N 3/08* (2013.01)

(58) Field of Classification Search
CPC ...................................................... G06N 3/08
See application file for complete search history.

(56) References Cited

U.S. PATENT DOCUMENTS

| | | | | |
|---|---|---|---|---|
| 9,858,527 | B1 | 1/2018 | Farley et al. | |
| 10,222,942 | B1 * | 3/2019 | Zeiler | G06N 5/022 |
| 10,957,309 | B2 * | 3/2021 | Na | G06N 3/084 |
| 11,132,567 | B2 | 9/2021 | Ikeda | |
| 11,526,762 | B2 | 12/2022 | Chenchal et al. | |
| 2020/0234110 | A1 * | 7/2020 | Singh | G06N 3/04 |
| 2021/0279575 | A1 * | 9/2021 | Komatsu | G06N 3/0499 |
| 2021/0306350 | A1 * | 9/2021 | Somol | H04L 63/1441 |
| 2021/0357172 | A1 * | 11/2021 | Sinesio | G06F 16/48 |
| 2022/0092351 | A1 * | 3/2022 | Huang | G06N 3/09 |
| 2022/0292356 | A1 * | 9/2022 | Singh | G06N 3/048 |
| 2022/0366220 | A1 * | 11/2022 | Roth | H04L 67/34 |
| 2022/0383207 | A1 * | 12/2022 | Sanchez | G06N 5/048 |
| 2023/0047187 | A1 * | 2/2023 | Deole | G10L 21/0272 |

(Continued)

OTHER PUBLICATIONS

Authors: Tsung-Yi Lin, Priya Goyal, Ross Girshick, Kaiming Hi, Piotr Dollar, "Focal Loss for Dense Object Detection", https://arxiv.org/abs/1708.02002, Date Published: Aug. 7, 2017. Arxiv.org.

*Primary Examiner* — Mariela Reyes
*Assistant Examiner* — Evel Honore

(57) ABSTRACT

A method and system for training an artificial neural network (ANN) is disclosed, specifically addressing the technical problem of training instability caused by randomly initialized weights. The invention introduces a novel, multi-phase training protocol executed by a processor. During an initial stabilization phase, the processor modifies the backpropagation of a weighted loss function by deprioritizing training on data from classes for which the ANN has a confidence level below a predetermined low threshold (e.g., less than or equal to 25 percent). This initial, focused training prevents erratic gradient updates to the weights of the network's layers, thereby forming stable and rigorous foundational neural pathways. Subsequent to the stabilization phase, a dynamic training phase commences where the network trains on the full dataset, with the training focus adjusted in real-time to reinforce the stable pathways. This protocol results in faster training convergence, a more robust final model, and improved accuracy, particularly for complex datasets, representing a significant technical improvement to the functioning of machine learning systems.

11 Claims, 3 Drawing Sheets

(56) References Cited

U.S. PATENT DOCUMENTS

| | | | | |
|---|---|---|---|---|
| 2023/0063171 | A1* | 3/2023 | Kwon | G05B 19/41835 |
| 2023/0419078 | A1* | 12/2023 | Singh | G06N 3/09 |
| 2024/0177000 | A1* | 5/2024 | Galeotti | G06N 3/048 |
| 2024/0249158 | A1* | 7/2024 | Narayanan | G06N 5/022 |
| 2024/0296372 | A1* | 9/2024 | Srivastava | G06N 20/00 |
| 2025/0131760 | A1* | 4/2025 | Wang | G06V 30/416 |

* cited by examiner

METHOD FOR STABILIZING NEURAL PATHWAYS IN EARLY-PHASE ARTIFICIAL NEURAL NETWORK TRAINING

TECHNICAL FIELD

The present invention pertains to the field of machine learning and, more specifically, to methods for training artificial neural networks. It relates to techniques for stabilizing early neural pathways in neural network training that have randomized initial class weights. This invention is applicable in various domains of machine learning, particularly in tasks involving classification, such as image and speech recognition, natural language processing, and other applications where neural networks are trained to distinguish among multiple classes or categories.

The method is designed to both strengthen the initial neural pathways based upon the uniqueness of initial randomized class weights, and to limit from training any unstable or problematic early neural pathways that can cause issues during later training. The improved neural pathways create several benefits: improved training time, more robust training, better artificial intelligence models, and better training on edge or low powered devices. The invention also causes convergence to occur at earlier epochs and with less computational resources.

BACKGROUND ART

The training of neural networks, particularly in the context of classification tasks, begins with a model state of randomly initialized weights. While it is not required that initial weights be randomized, in standard neural network architectures, the weights of neurons are typically initialized to small random values prior to training. This practice, known as random weight initialization, serves to break symmetry and allow the network to learn diverse feature representations across layers. Without random initialization, neurons in the same layer would compute identical outputs and update in lockstep, rendering the network ineffective.

However, while random initialization is essential for training, it introduces instability during the initial learning phase. Early weight values may lead the network to misclassify certain classes with high confidence and others with extremely low confidence, even before meaningful learning has occurred. These early-stage predictions shape the network's pathway formation. If not properly managed, they can entrench suboptimal patterns or unstable gradients.

The present invention addresses this technical challenge by detecting and suppressing the influence of low-confidence predictions during early training, thereby stabilizing the network's foundational architecture. This initial random state can lead to significant inefficiencies and instabilities in the early stages of training, especially when the model is forced to learn from classes for which its initial predictions are highly uncertain. Conventional training methods typically treat each class with equal importance throughout the learning process, failing to account for the unique challenges of stabilizing the network's foundational pathways. This can result in poor convergence, wasted computational resources, and even outright training failure on less-powerful hardware where processing timeouts are common. In standard practice, neural networks are trained using methods like stochastic gradient descent, where the model learns to minimize a loss function that represents the error in its predictions. While techniques such as class weighting exist to address class imbalance, these approaches often rely on static weights determined prior to training and do not adapt dynamically based on the model's evolving understanding of each class, nor does it capitalize on random (or stochastic) initial weight distribution. This creates unstable neural pathways which can affect later training, fallout, and catastrophic learning collapse.

An "unstable neural pathway" refers to a condition arising during the initial stages of training where, due to the randomly initialized weights, the network forms flawed or inefficient internal connections. When a model with no prior knowledge is forced to learn from data classes for which it has extremely low confidence, the resulting gradient updates can be erratic and disproportionate. This process creates a poor foundation, leading the model to learn incorrect or suboptimal patterns that become entrenched and are difficult to correct in later stages of training.

The impact of these unstable early pathways is significant and detrimental to the training process. They are a primary cause of inefficient training, leading to slower convergence and wasted computational resources. In practical terms, this inefficiency can manifest as training failure on hardware with limited processing bandwidth, where training programs may "time-out" or terminate before completion. Furthermore, these flawed foundational pathways can cause the model to overfit to certain classes and ultimately reduce the final model's overall accuracy and ability to generalize to new data.

Moreover, the field of machine learning has seen various attempts to improve training efficiency and model accuracy, such as adaptive learning rates, dropout, and batch normalization. However, these techniques do not specifically focus on improving early neural pathways such that any training process utilizes the unique nature of randomized initial class weights.

Further, attempts to improve or increase training quality rely primarily on increasing GPU or CPU cores, memory size and/or bandwidth, or adding more computational units to increase capacity and/or workload. Indeed, the current state of the art and thinking in the field of computer learning is to continue to "brute force" the problem by increasing the ability of computers to compute more training cycles in larger numbers, rather than to address the initial neural pathways for which the model trains. This invention adopts a method that the current art dissuades. The invention's approach is one that is more efficient, leading to better effective models could be trained on cheaper and more widely available hardware, rather than relying on ever expanding larger computing units with more capacity at higher and higher costs.

Therefore, there exists a need for an improved method that enhances the neural network training process by incorporating a means for addressing initial neural pathway issues. Such a method would manipulate the initial training process by forcing the neural network to deprioritize, but not eliminate, those classes for which the model was not confident in below a certain threshold.

DISCLOSURE

The invention proposes a specific, multi-phase method for training an artificial neural network that begins with randomly initialized weights. The method solves the problem of initial training instability by first stabilizing the network's foundational pathways before proceeding to a full, dynamically adjusted training regimen.

Phase 1: Initial Stabilization. The training process begins with an initial stabilization phase. During this phase, the model's confidence for each class prediction is assessed after each epoch. A predetermined confidence threshold, preferably a non-zero value less than or equal to 25 percent, is used as a control mechanism. If the model's confidence for a particular class falls below, or begins below this threshold, the training data for that class is temporarily deprioritized. This is accomplished by assigning a significantly lower weight to that class in the weighted loss function, such as:

$$L(xi,yi,W)=w\_yi\cdot l(f\theta(xi),yi)$$

where w_yi is the diminished weight. This preventative step ensures that the network does not form unstable pathways based on highly uncertain predictions while its weights are still in a random state.

Phase 2: Full Dynamic Training. After the initial stabilization phase is complete, the method transitions to a second phase. In this phase, the deprioritization protocol is modified, wherein all classes would initialize at the same weight previously, and the network is trained on the full dataset. The training then proceeds with a real-time feedback loop where the training focus is dynamically adjusted. In this phase, class weights are adjusted to be inversely proportional to class performance; classes where the model now exhibits lower confidence receive higher weights to encourage improvement, and classes with higher confidence receive lower weights. This promotes robust neural pathway formation and encourages efficient computational convergence.

Referring now to FIG. 1, a high-level method flow of the invention is depicted. The process begins with Step 101, where a plurality of nodes is created, comprising at least one input layer, at least one hidden layer, and at least one output layer, forming a standard feedforward artificial neural network architecture. At Step 102, multi-class digital data is input into a memory, such as a local or remote RAM or storage device accessible to the processor. This dataset includes labeled training examples from multiple categories to be used in the classification task. In Step 103, the processor assigns initial class weights to each class in the dataset. These weights are generated stochastically, meaning they are initialized randomly as is common in modern neural network practice to break symmetry and enable diverse feature learning across neurons. The method then proceeds to Step 104, which initiates the initial training phase. During this phase, the invention introduces a novel modification to standard training logic: for any class in which the neural network exhibits a confidence level below a predetermined threshold (25% or lower), the training process deprioritizes the data associated with that class by reducing its weight in the loss function.

This deprioritization modifies the standard backpropagation algorithm, preventing unstable or erratic gradient updates from forming around classes the model is not yet ready to learn from. As a result, this step prevents the formation of unstable neural pathways and facilitates the creation of stable foundational pathways, allowing the network to reach convergence more efficiently in later phases.

Referring now to FIG. 2, the dynamic training phase of the invention is illustrated. The process begins with an input dataset 201, consisting of training samples in the form of input-output pairs (x, y), where x represents the input data and y the corresponding class label.

This dataset is passed into the neural network model, which first performs a forward pass 202 to generate predictions. These predictions are then used in backward propagation 203 to update the model's weights by minimizing a loss function. Unlike conventional training methods, the loss function here is weighted by class, allowing the model to allocate more or less emphasis to certain classes based on performance. Next, the Confidence Assessment Module 204 calculates the model's confidence for each class based on the most recent predictions. This module plays a critical role in implementing the method's core innovation: dynamically adjusting training weights based on evolving model certainty. The output of the Confidence Assessment Module is passed into a feedback loop 205, which updates the class weights accordingly. Classes for which the model exhibits low confidence below the preset threshold are deprioritized, thereby promoting the formation of stable neural pathways early in the learning process. The feedback loop 205 thus allows real-time performance monitoring and dynamic class weight adjustments that feed into the next training cycle. This mechanism continues epoch to epoch, adapting the network's focus to promote robust learning and more efficient convergence, especially on resource-limited hardware or imbalanced datasets.

Referring now to FIG. 3, an embodiment of a system suitable for implementing the methods described herein is illustrated. The system includes a central computing device 301, such as a server or workstation, configured to execute the neural network training protocol comprising both the Initial Stabilization Phase and the Full Dynamic Training Phase as previously described. The computing device 301 may access or store training data within a connected database or data storage unit 303, which may include labeled examples for a classification task. The neural network training logic, including the confidence-based weighting protocol, is implemented via a software or hardware-based Neural Network Early Pathway Training Stabilizer Module 305, which interfaces with computing device 301. This module dynamically adjusts class weights based on confidence thresholds, as described in detail in the technical solution section. The system may also receive input data from various sources. In the illustrated embodiment, a first user device 302*a*, such as a desktop or laptop computer, and a second user device 302*b*, such as a mobile phone or tablet, are shown communicating with the central computing device 301 via a communication network 304 (e.g., the internet, intranet, or a private LAN). These devices may serve as endpoints for data generation, labeling interfaces, or inference delivery. They may also communicate data from external data sources 306*a* and 306*b*, respectively, which may include labeled training data or raw input data to be processed by the system. The communication network 304 facilitates data exchange between the devices and computing system, enabling real-time adjustment of class weights during training, centralized execution of neural network optimization routines, and remote feedback loops necessary for performance assessment and convergence tracking.

Technical Problem

The present invention has been made in view of the above circumstances in the background art, and it is an object of the present invention to provide a method for stabilizing the early training phase of an artificial neural network. A core technical problem in the art is that the randomly initialized weights of a new network produce highly uncertain predictions, which can lead to the formation of unstable neural pathways if the model attempts to learn from all data classes simultaneously. This instability results in inefficient training, slower convergence, and a higher rate of training failure, particularly on existing or less-powerful hardware. The present invention solves this technical problem with a specific, multi-phase training protocol.

Further, the prior art in the field does teach away from such a method. One such citation cites that such dynamic weighting models are unnecessary and unneeded, as it states: "simply tuning existing components of standard deep learning pipelines, such as the batch size, data augmentation, optimizer, and label smoothing, can achieve state-of-the-art performance without any such specialized class imbalance methods."[1] However, such position in the field does not account for vast improvements in the training feedback, and does not even address why setting the feedback confidence weighting and focus adjustments to low levels results in such drastic improvement as is claimed in the current method by preventing unstable neural network pathway formation early in training. Indeed, not only does this method encapsulate an approach that prior art teaches away from, it does so by taking further adjustments to the novel method which is in and of itself successful, and then further adjusts them for maximum efficiency improvements, including capitalizing on the inherent nature of machine artificial neural network training

[1]https://doi.org/10.48550/arXiv2312.02517, Simplifying Neural Network Training Under Class Imbalance Ravid Shwartz-Ziv, Micah Goldblum, Yucen Lily Li, C. Bayan Bruss, Andrew Gordon Wilson initialization having randomly initialized weights, a feature unique to machine learning only on a computer, and is a direct improvement of how the computer functions itself.

TECHNICAL SOLUTION

The technical solution proposed in this invention addresses the aforementioned challenges by introducing a dynamic class weighting system in neural network training, guided by the model's confidence in its predictions. This solution involves several key components:

Initial Stabilization Phase: The method first employs an initial training phase designed to form stable, more rigorous foundational pathways, and to improve how artificial neural network training occurs on a computer. Specifically, the fact that initial stochastic weight values are assigned during initialization is seized upon and further utilized. During this phase, the model's confidence in its predictions for each class is continually assessed. For any class where the model's confidence is below a predetermined threshold, specifically a value less than or equal to 25 percent, the data from that class is temporarily deprioritized. This prevents the model from being influenced by highly uncertain predictions stemming from its own initial random weight state, and capitalizes on existing random weight amounts that are found to be useful, thereby stabilizing the formation of its early neural pathways. Experimental data suggest the optimal level for this deprioritization does occur at under 25%. Further data indicates at this level, about 90% of training runs reach convergence at quicker speeds, with less epochs, and with more predictive accuracy than a model not using this method. The explanation for the remaining 10% that are not more efficient is explained by the stochastic nature of machine learning itself. In those runs, the random weight initialization cannot be utilized to further improve the functioning of the process on the computer.

Full Training and Dynamic Adjustment Phase: Subsequent to the initial stabilization phase, the training protocol transitions. In this second phase, the neural network is trained on the full training dataset. During this phase, any ongoing class weights are all reset to an even amount, and then a feedback loop continuously monitors the model's performance and dynamically adjusts the training focus in real-time based on ongoing class confidence to encourage computational convergence and improve overall model accuracy.

Balanced Learning Focus: The method ensures a balanced learning focus across all classes, preventing overfitting to certain classes and improving the model's ability to handle class imbalances. This is achieved by ensuring that all classes receive appropriate attention based on the model's current understanding and performance.

Phase Transition Mechanism: The transition from the "Initial Stabilization Phase" to the "Full Training and Dynamic Adjustment Phase" can be triggered by one or more predefined criteria. For example, the transition may occur after a set number of initial epochs (e.g., 5-10 epochs) have completed, allowing sufficient time for the initial pathways to stabilize. Alternatively, the transition can be triggered when the model's overall loss or accuracy metric reaches a certain stability plateau, indicating that the initial, most volatile period of training is over. This ensures the stabilization is effective before the model engages in more complex, dynamic learning, and can be triggered by the assessment of accuracy or confidence values during the training process.

The formation of more rigorous neural pathways is a direct consequence of the initial stabilization phase. By temporarily deprioritizing data from classes where the model's confidence is below the predetermined threshold, the training process is deliberately focused on the classes for which the network's randomly initialized weights are, by chance, better suited. This allows the model to first refine a stable, foundational set of weights based on "easier" or more certain predictions. This initial, focused learning establishes a baseline of knowledge and prevents the erratic, high-magnitude gradient updates that would otherwise result from attempting to learn from highly uncertain data. These foundational connections, formed without the disruptive influence of very low-confidence data, constitute the more rigorous and stable early neural pathways.

Once this stable foundation is established, the network is better equipped to tackle the more complex or challenging classes during the subsequent full dynamic training phase. The now-stabilized network can learn from the more difficult data more effectively because it is no longer operating from a state of complete randomness. This sequential approach avoids the initial chaotic learning state that leads to training failures and directly results in the advantageous effects of faster computational convergence, reduced resource utilization, and a final model with increased accuracy and better generalization capabilities Application Across Diverse Datasets: The proposed solution is designed to be applicable across a wide range of multi-class classification tasks, regardless of the specific characteristics of the dataset, making it a versatile tool in various machine learning applications.

Advantageous Effects

The proposed method for early neural pathway stabilization, guided by the model's confidence, offers several advantageous effects, making it a significant improvement over traditional training methodologies:

Improved Learning Efficiency: The method allocates learning resources more effectively, focusing on classes that require more attention by first building stronger neural pathways on classes it is confident in, and capitalizing on initial random weight distribution on all classes. This results in a more efficient learning process, reducing training time and computational resources needed.

Enhanced Handling of Class Imbalance: The focus on initial neural pathway enhancement in the method allows for better management of class imbalance within datasets. It ensures that underrepresented or more challenging classes receive the necessary focus, at a time when the neural network can best address challenging classes by first building stronger neural pathways elsewhere, and by preventing unstable neural pathways from causing further issues later on during the training lifecycle. Improved initial neural pathway rigor thereby enhances the model's performance across all classes.

For example, consider an image classification task with the classes 'Car', 'Truck', and 'Motorcycle'. During the initial stabilization phase, the network is shown many clear images of cars and motorcycles. It quickly develops high confidence in identifying these classes, forming a Rigorous Neural Pathway (RNP) for each. The 'Car' RNP becomes a stable set of weighted connections that reliably detects features like four wheels, a unibody frame, and passenger doors. Now, the network is presented with a more ambiguous image: a pickup truck. A conventional network might struggle, as the image contains features of both a 'Car' (four wheels, doors, a cab) and a 'Truck' (an open cargo bed, higher ground clearance). However, in the claimed method, the pre-existing RNP for 'Car' provides a strong, stable baseline signal. The network can leverage this rigorous understanding of what constitutes a 'Car' to more effectively isolate and learn the differentiating features of the 'Truck'. Instead of being confused by a mix of uncertain signals, it uses its stable knowledge to conclude, "This is very similar to a Car, but the presence of this open cargo bed is the key difference, therefore it is a Truck." This allows for more rapid and accurate learning on complex or overlapping classes Increased Model Accuracy: The two phase method helps the model to develop a more balanced and comprehensive understanding of all classes. This leads to improved accuracy and generalization capabilities of the model, especially in complex multiclass classification tasks.

For example, consider an image classification task with the classes 'Car' and 'Cat'. During the initial stabilization phase, the network is shown images of both. Due to the randomly initialized weights, its initial confidence in identifying a 'Car' might be 28%, but its confidence in identifying a 'Cat' is only 5%. Because the confidence for 'Cat' is below the predetermined 25% threshold, the method temporarily deprioritizes training on 'Cat' images, thereby excluding the formation of unstable neural pathways regarding the 'Cat' class. The network instead focuses exclusively on learning from 'Car' images, building a stable and Rigorous Neural Pathway (RNP) based on structural features like wheels and a chassis.

Subsequently, the stabilization phase ends, and the network begins the full dynamic training phase on the complete dataset. It is now presented with a complex image: a car featuring a high-resolution vinyl wrap of a cat's face across its side. The network's well-established 'Car' RNP provides a strong, high-confidence signal based on the object's underlying three-dimensional structure. While the cat wrap provides conflicting textural data, the network is better able to process it correctly because it was prevented from forming flawed, unstable 'Cat' pathways earlier in the process. It leverages its rigorous understanding of a 'Car' to correctly identify the object's primary class, demonstrating a significant improvement in accuracy that is a direct result of the initial stabilization protocol.

Prevention of Overfitting: The method mitigates the risk of overfitting to specific classes during the second phase, particularly those that are overrepresented or simpler to learn. By continuously adapting the class weights, it ensures that the model does not bias its learning towards certain classes at the expense of others.

Flexibility and Versatility: The proposed solution is designed to be applicable to a wide range of neural network architectures and classification tasks. Its flexibility makes it suitable for various applications, from image and speech recognition to natural language processing.

Real-time Adaptability: In the full dynamic training phase, the real-time feedback mechanism allows the training process to be highly responsive to the model's current performance, enabling rapid adjustments to class weights as the model's confidence evolves. This adaptability is key to maintaining an efficient and effective learning trajectory throughout the training process.

Improved Resource Utilization: By optimizing the training process, the method makes better use of computational resources, which is particularly beneficial in scenarios where such resources are limited or costly. Results have been observed to show improvement anywhere between 1% to 13% more efficient than the standard training model at least 90% of the time.

BEST MODE FOR CARRYING OUT INVENTION

Figure 1:
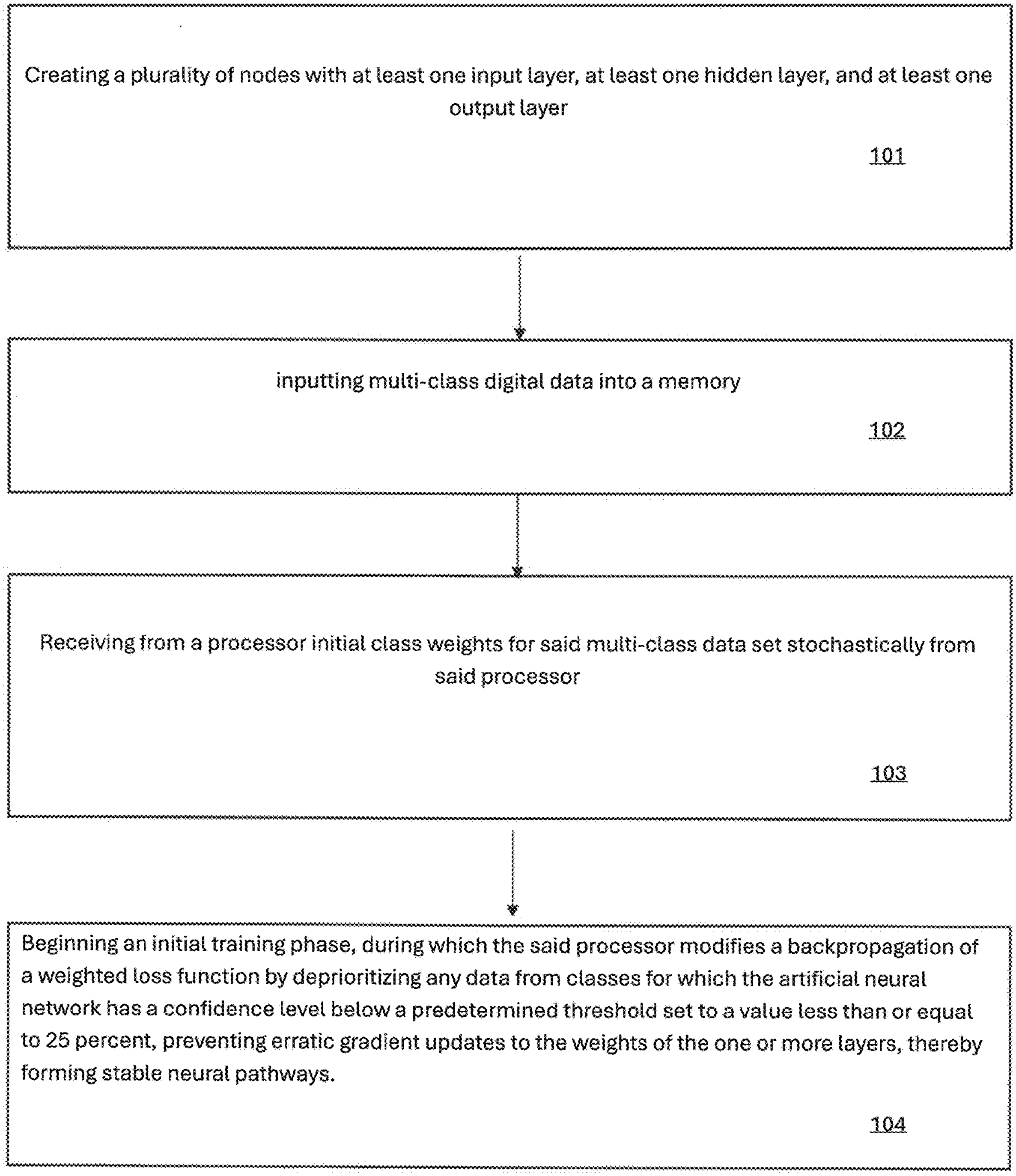
FIG. 1 shows the initial stabilization phase process and low confidence deprioritization.
Figure 2:
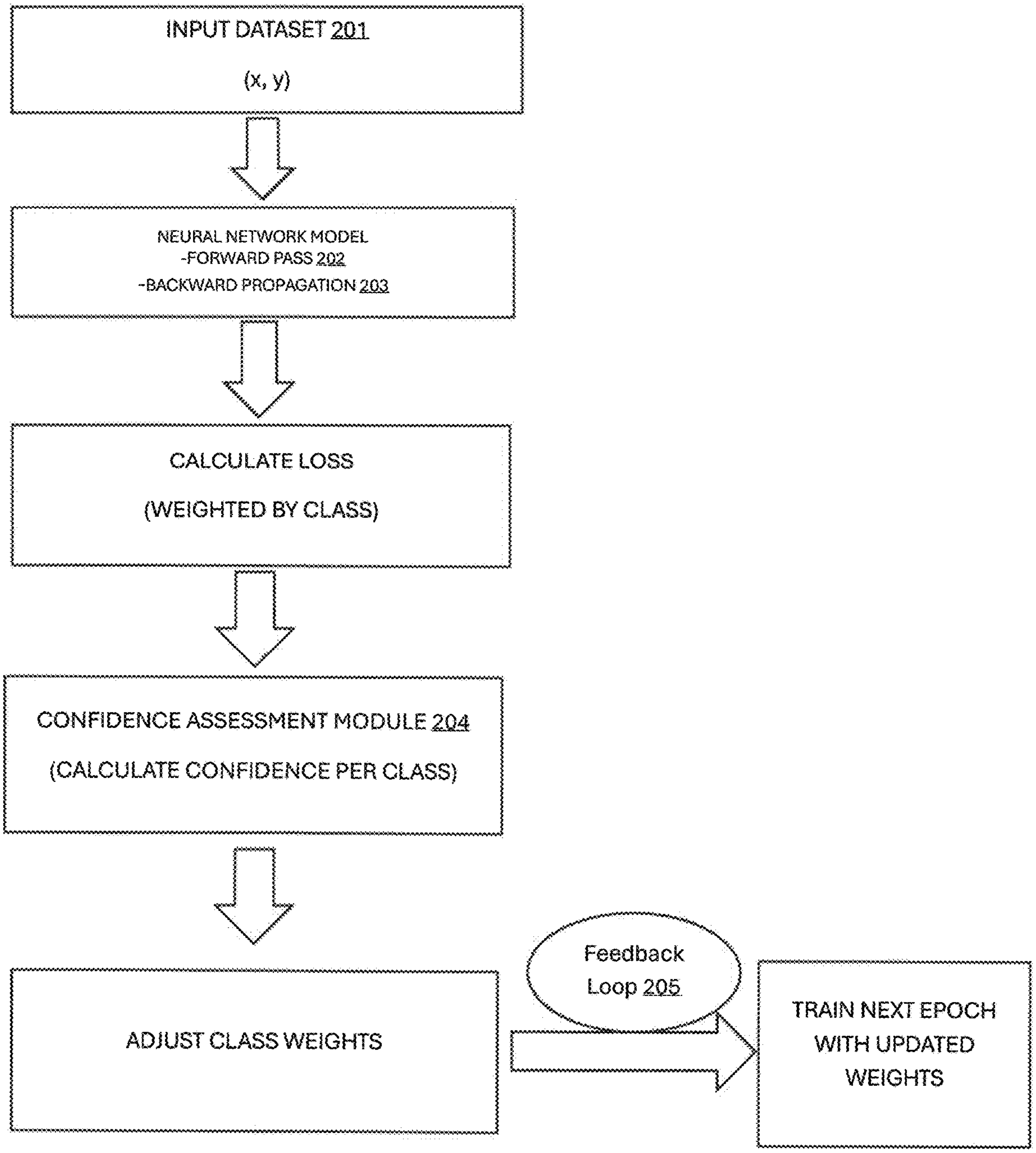
FIG. 2 illustrates a schematic flow diagram of the dynamic weighting phase of the invention, showing the feedback loop and confidence-based class weight adjustment carried out during each epoch of training.
Figure 3:
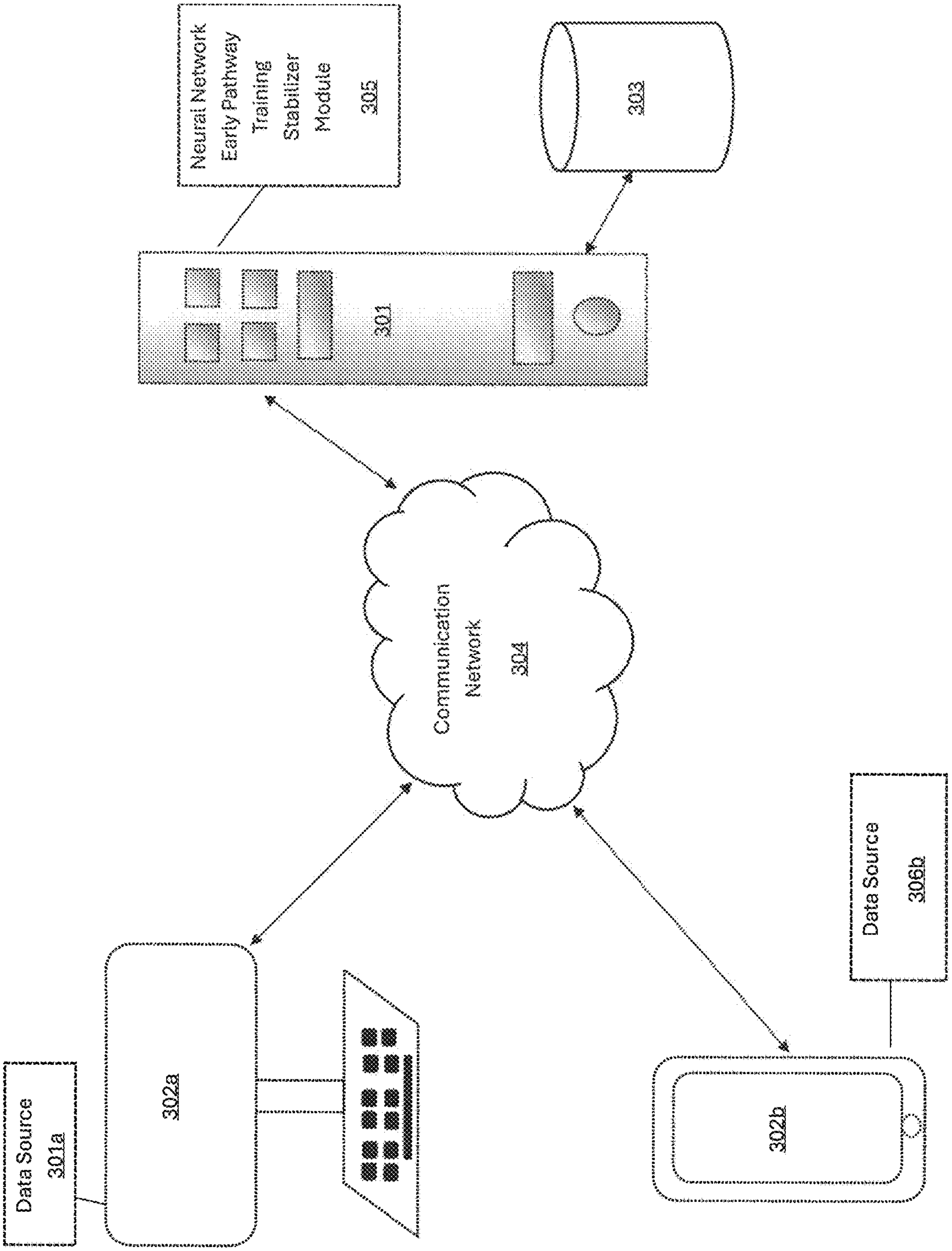
FIG. 3 shows an embodiment of a system architecture suitable for implementing the claimed method, including exemplary computing components, data sources, and a neural network stabilizer module.

The currently possessed best mode for carrying out the invention is disclosed in the computer code attached to this application in Python and Pytorch. Using the method disclosed in the code provided is the most efficient and competent way known to the inventor to carry out the invention, although this method could be implemented in various code languages and computer structures.

I claim:

1. A method for stabilizing the early neural pathways of an artificial neural network (ANN), the method comprising: (a) creating a plurality of nodes with at least one input layer, at least one hidden layer, and at least one output layer; (b) inputting multi-class digital data into a memory; (c) receiving from a processor initial class weights for said multi-class data set stochastically from said processor; and (d) executing an initial training phase comprising: monitoring the model's confidence metrics generated by said processor for the said input data; detecting a specific data subset having a confidence metric at or below a stability threshold set to a value less than or equal to 25 percent; and triggering a stabilization protocol that modifies a parameter update sequence by constraining the influence of said detected data written to the memory for the plurality of nodes, thereby inhibiting the effect of said detected data below the stabilization threshold to said memory which cause destabilizing model updates in the plurality of nodes and thereby forming stable neural pathways.

2. The method of claim 1, further comprising a step subsequent to the initial training phase, wherein the processor institutes a dynamic training phase by discontinuing an application of the predetermined stability threshold and instead dynamically adjusting a training focus in real-time based on ongoing class confidence levels to reinforce stable neural pathways.

3. The method of claim 1, wherein the confidence metrics are assessed using probability thresholds.

4. The method of claim 1, wherein the data inputted contains multiple classes, a portion of which contains conflicting, confounding, ambiguous, composite, or other such multi-class data facilitating the creation of rigorous neural pathways regarding individual classes, and thereby augmenting the artificial neural network's ability to avoid making classification errors in multi-class, confounding, ambiguous, composite or other such multi-class data.

5. The method of claim 1, wherein the predetermined confidence stability threshold value is a non-zero value.

6. The method of claim 1, wherein constraining the influence of said detected data comprises temporarily reducing without deactivating or fully disregarding the influence of said data on weight adjustments for a plurality of nodes within at least one layer of the ANN.

7. The method of claim 1, wherein modifying the parameter update sequence comprises:

identifying the detected data below the stabilization threshold, processing said detected data through a deprioritization protocol wherein a connection update influence on the plurality of nodes is diminished without eliminating the detected data from the memory or causing said detected data to have zero influence on the said ANN, whereby stable neural pathways form in the initial training phase.

8. A server computing system comprising:

a processor; and a non-transitory memory storing a set of instructions, the instructions when executed by the processor causing the system to perform operations comprising: (a) creating a plurality of nodes with at least one input layer, at least one hidden layer, and at least one output layer; (b) inputting multi-class digital data into the same or a linked set of memory; (c) receiving from a processor initial class weights for said multi-class data set stochastically from said processor; and (d) executing an initial training phase comprising: monitoring the model's confidence metrics generated by said processor for the said input data; detecting a specific data subset having a confidence metric at or below a stability threshold set to a value less than or equal to 25 percent; and triggering a stabilization protocol that modifies a parameter update sequence by constraining the influence of said detected data written to the memory for the plurality of nodes, thereby inhibiting the effect of said detected data below the stabilization threshold to said memory which cause destabilizing model updates in the plurality of nodes and thereby forming stable neural pathways.

9. The server computing system of claim 8, wherein the instructions, when executed by the processor, cause the system to perform a further operation subsequent to the initial training phase, the further operation comprising: instituting a dynamic training phase by discontinuing an application of the predetermined stability threshold and instead dynamically adjusting a training focus in real-time based on ongoing class confidence levels to reinforce stable neural pathways.

10. The server computing system of claim 8, wherein constraining the influence of said detected data comprises temporarily reducing without deactivating or fully disregarding the influence of said data on weight adjustments for a plurality of nodes within at least one layer of the ANN.

11. The server computing system of claim 8, wherein modifying the parameter update sequence comprises: identifying the detected data below the stabilization threshold, processing said detected data through a deprioritization protocol wherein a connection update influence on the plurality of nodes is diminished without eliminating the detected data from the memory or causing said detected data to have zero influence on the said ANN, whereby stable neural pathways form in the initial training phase, the combination of which fonns a Neural Network Early Pathway Training Stabilizer Module in the Server System.

* * * * *